(12) United States Patent
Honda

(10) Patent No.: US 12,445,561 B2
(45) Date of Patent: Oct. 14, 2025

(54) INFORMATION PROCESSING APPARATUS, NON-TRANSITORY COMPUTER READABLE MEDIUM STORING INFORMATION PROCESSING PROGRAM, AND INFORMATION PROCESSING METHOD FOR MANAGING DEVICE NOT SUPPORTING MANAGEMENT VIA NETWORK THROUGH VIRTUAL DEVICE

(71) Applicant: FUJIFILM Business Innovation Corp., Tokyo (JP)

(72) Inventor: Takuya Honda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 393 days.

(21) Appl. No.: 17/966,880

(22) Filed: Oct. 16, 2022

(65) Prior Publication Data

US 2023/0421708 A1 Dec. 28, 2023

(30) Foreign Application Priority Data

Jun. 22, 2022 (JP) ................................ 2022-100512

(51) Int. Cl.
*H04N 1/00* (2006.01)
*G06F 3/12* (2006.01)

(52) U.S. Cl.
CPC ....... *H04N 1/00344* (2013.01); *G06F 3/1203* (2013.01); *G06F 3/1232* (2013.01); *G06F 3/1288* (2013.01); *H04N 1/00244* (2013.01)

(58) Field of Classification Search
CPC .......... H04N 1/00204; H04N 1/00244; H04N 1/00278; H04N 1/00344; H04N 1/00347;
(Continued)

(56) References Cited

U.S. PATENT DOCUMENTS 6,567,184 B2 * 5/2003 Aoki ................. G06F 3/1288
358/404
7,124,212 B2 * 10/2006 Shimizu ............ G06F 3/1291
709/239

(Continued)

FOREIGN PATENT DOCUMENTS

JP 2011159127 8/2011
JP 5531652 6/2014

*Primary Examiner* — Scott A Rogers
(74) *Attorney, Agent, or Firm* — JCIPRNET

(57) ABSTRACT

An information processing apparatus includes a memory, and a processor configured to: store, in the memory, a first virtual device that is virtually realized using information about a first device and a second virtual device that is virtually realized using information about a second device; acquire the information about the first device from the first device capable of communicating with a communication unit of the information processing apparatus, and reflect the acquired information about the first device in the first virtual device; acquire, via the first device, the information about the second device from the second device incapable of communicating with the communication unit, and reflect the acquired information about the second device in the second virtual device; and use the information about the first device reflected in the first virtual device, and use the information about the second device reflected in the second virtual device.

12 Claims, 10 Drawing Sheets

(58) Field of Classification Search
CPC ...... G06F 3/1203; G06F 3/1204; G06F 3/121; G06F 3/1218; G06F 3/1219; G06F 3/1224; G06F 3/1226; G06F 3/1229; G06F 3/1231; G06F 3/1232; G06F 3/1234; G06F 3/1235; G06F 3/1285; G06F 3/1286; G06F 3/1287; G06F 3/1288; G06F 3/1291
See application file for complete search history.

(56) References Cited

U.S. PATENT DOCUMENTS

| | | | | |
|---|---|---|---|---|
| 7,502,134 B2* | 3/2009 | Aoki | ............. | G06F 3/1244 |
| | | | | 358/1.15 |
| 8,606,902 B2* | 12/2013 | Ikeno | ............. | H04L 43/0817 |
| | | | | 709/224 |
| 9,264,478 B2* | 2/2016 | Hon | ............. | H04L 67/04 |
| 10,795,616 B1* | 10/2020 | Zhang | ............. | G06F 3/1289 |
| 10,956,095 B2* | 3/2021 | Takeo | ............. | G06F 3/1232 |
| 2007/0076237 A1* | 4/2007 | Kudo | ............. | G06F 3/1204 |
| | | | | 358/1.15 |
| 2015/0029542 A1* | 1/2015 | Morita | ............. | G06F 3/1236 |
| | | | | 358/1.15 |
| 2015/0029543 A1* | 1/2015 | Morita | ............. | H04N 1/00244 |
| | | | | 358/1.15 |
| 2018/0069969 A1* | 3/2018 | Harada | ............. | H04N 1/00954 |
| 2024/0323302 A1* | 9/2024 | Sato | ............. | H04W 76/19 |

\* cited by examiner

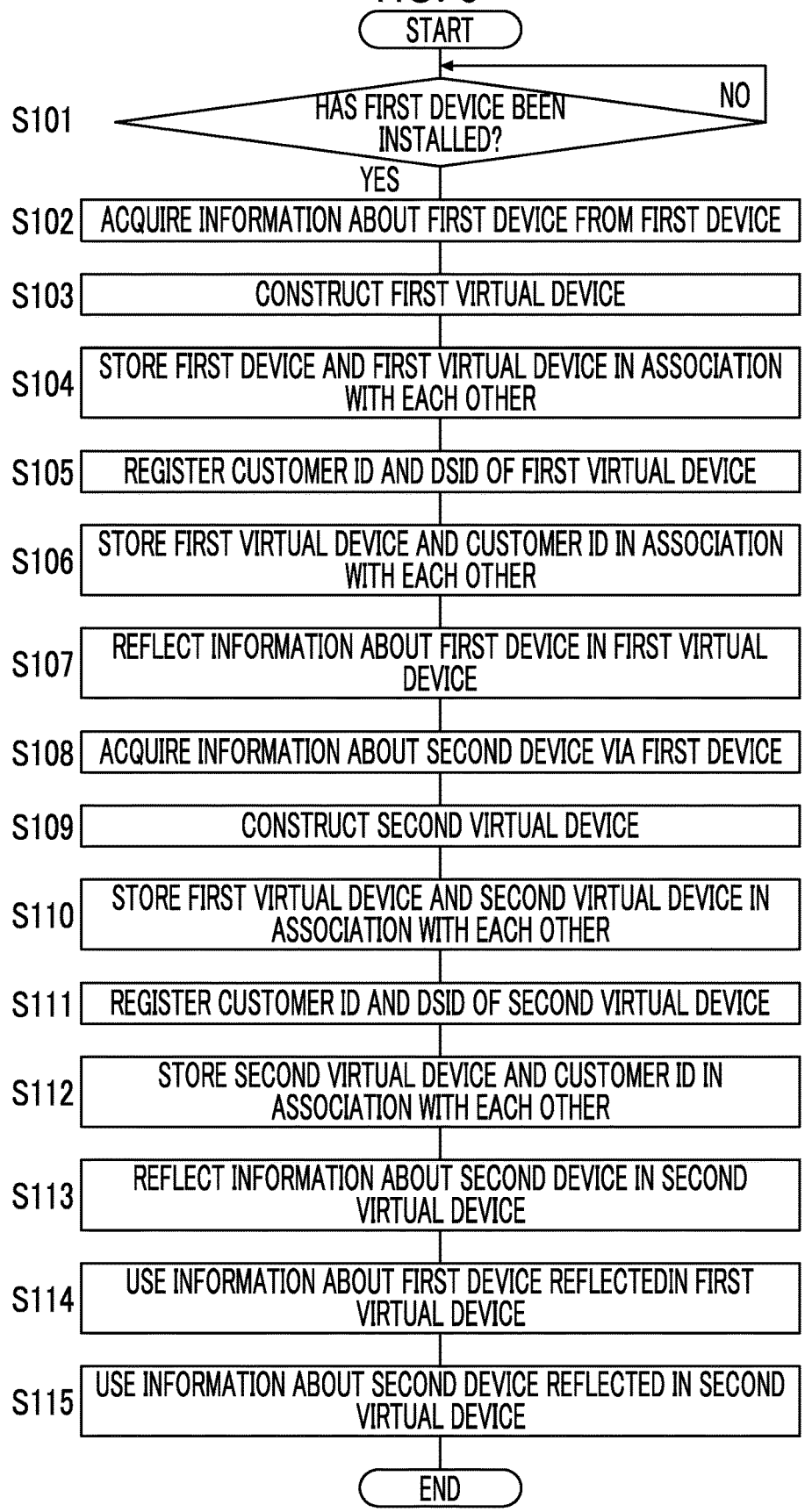

FIG. 7

EACH DEVICE IDENTIFICATION INFORMATION TABLE

| DSID | DS NAME | DS FUNCTION PRESENCE/ABSENCE |
|---|---|---|
| 2430931200 | OTHER COMPANY'S DEVICE A | ABSENT |
| 1295069977 | HOST COMPANY'S DEVICE B | PRESENT |
| 8830518266 | HOST COMPANY'S DEVICE C | PRESENT |

DS FUNCTION CORRESPONDENCE LIST TABLE

| PARENT DSID | CHILD DSID |
|---|---|
| 1295069977 | 2430931200 |

EACH DEVICE SYNCHRONIZATION DATA TABLE

| DSID | MODEL CODE | SERIAL NUMBER | TOTAL NUMBER OF OUTPUT PAGES |
|---|---|---|---|
| 2430931200 | AAAA1111 | 951753 | 85195 |
| 1295069977 | BBBB2222 | 456258 | 17004 |
| 8830518266 | BBBB2222 | 183729 | 62157 |

FIG. 8

EACH CUSTOMER IDENTIFICATION INFORMATION TABLE

| CUSTOMER ID | CUSTOMER NAME |
|---|---|
| 00001 | AA FOOD |
| 00002 | BB HOSPITAL |

CUSTOMER ID-DSID LIST TABLE

| CUSTOMER ID | DSID |
|---|---|
| 00001 | 2430931200 |
| 00001 | 1295069977 |
| 00002 | 8830518266 |

INFORMATION PROCESSING APPARATUS, NON-TRANSITORY COMPUTER READABLE MEDIUM STORING INFORMATION PROCESSING PROGRAM, AND INFORMATION PROCESSING METHOD FOR MANAGING DEVICE NOT SUPPORTING MANAGEMENT VIA NETWORK THROUGH VIRTUAL DEVICE

CROSS-REFERENCE TO RELATED APPLICATIONS

This application is based on and claims priority under 35 USC 119 from Japanese Patent Application No. 2022-100512 filed Jun. 22, 2022.

BACKGROUND

(i) Technical Field

The technology of the present invention relates to an information processing apparatus, a non-transitory computer readable medium storing an information processing program, and an information processing method.

(ii) Related Art

There are technologies for managing vendor devices from a plurality of vendors.

JP2011-159127A discloses a management apparatus that manages vendor devices from a plurality of vendors using a network management protocol, the management apparatus including: a storage unit that stores acquisition information for acquiring device information from the plurality of vendor devices; an acquisition unit that acquires the device information from the plurality of vendor devices based on the acquisition information; and a management unit that manages the device information acquired from the plurality of vendor devices in association with each vendor, in which the acquisition information includes location information of standard device information that can be commonly acquired from all of the plurality of vendor devices, and location information of extended device information that depends on each of the plurality of vendors and can be acquired for each vendor device, and the acquisition unit acquires, from a first vendor device, standard device information based on the location information of the standard device information and first extended device information based on location information of extended device information about the first vendor device, and acquires, from a second vendor device, standard device information based on the location information of the standard device information and second extended device information based on location information of extended device information about the second vendor device.

SUMMARY

A technology capable of managing devices via a network is known.

However, the technology does not function in all devices, and the technology does not function unless the device supports with management via a network. Therefore, the technology cannot function in devices that do not support management via a network.

Aspects of non-limiting embodiments of the present disclosure related to an information processing apparatus, a non-transitory computer readable medium storing an information processing program, and an information processing method that can support management via a network even though a device does not support management via a network.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a memory, and a processor configured to: store, in the memory, a first virtual device that is virtually realized using information about a first device and a second virtual device that is virtually realized using information about a second device; acquire the information about the first device from the first device capable of communicating with a communication unit of the information processing apparatus, and reflect the acquired information about the first device in the first virtual device; acquire, via the first device, the information about the second device from the second device incapable of communicating with the communication unit, and reflect the acquired information about the second device in the second virtual device; and use the information about the first device reflected in the first virtual device, and use the information about the second device reflected in the second virtual device.

BRIEF DESCRIPTION OF THE DRAWINGS

Exemplary embodiment(s) of the present invention will be described in detail based on the following figures, wherein:

FIG. 6 is a flowchart showing a flow of management processing of the information processing apparatus according to the first exemplary embodiment;

FIG. 7 is an example of a table managed by a DS management unit of the information processing apparatus according to the first exemplary embodiment;

FIG. 8 is an example of a table managed by a tenant management unit of the information processing apparatus according to the first exemplary embodiment;

DETAILED DESCRIPTION

Figure 1:
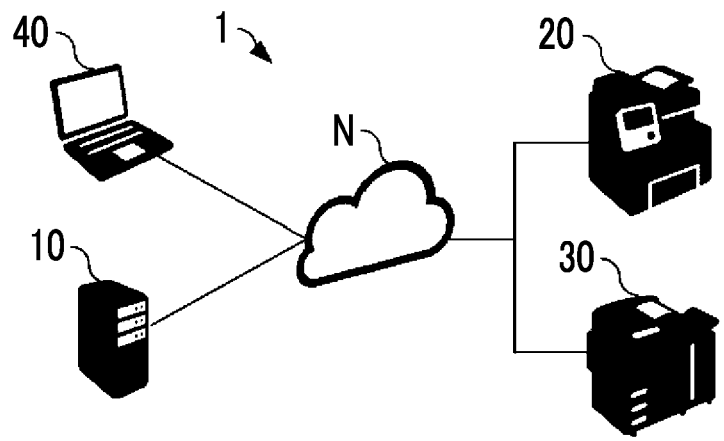
FIG. 1 is a system configuration diagram of an information processing system according to a first exemplary embodiment.

Hereinafter, exemplary embodiments of the technology of the present invention will be described with reference to the drawings. The identical reference numerals are given to the identical or equivalent components and parts in each drawing. In addition, the dimensional ratios in the drawings are exaggerated for convenience of description and may differ from the actual ratios.

First Exemplary Embodiment

FIG. 1 is a system configuration diagram of an information processing system 1 according to a first exemplary embodiment. The information processing system 1 includes an information processing apparatus 10, a first device 20, a second device 30, and a terminal device 40.

The information processing apparatus 10 is a server that manages a virtual device that is virtually realized using information about a real device that actually exists. The information processing apparatus 10 manages virtual devices using, for example, a digital shadow (DS) function. Here, the DS function holds information and implements an interface necessary for managing the real device from a cloud service. In addition, the DS is a modeled virtual device capable of holding or executing a function that extends the function of the real device in cooperation with the real device. Note that, in the present disclosure, the information processing apparatus 10 may be referred to as host apparatus.

The first device 20 is a device that supports management via a network N. In other words, the first device 20 is a device that can communicate with a communication unit of the information processing apparatus 10, which will be described later. The first device 20 is, for example, an image forming device, a network device, a precision device, or the like.

The second device 30 is a device that does not support management via the network N In other words, the second device is a device that cannot communicate with the communication unit of the information processing apparatus 10, which will be described later. The first device 20 is, for example, an image forming device, a network device, a precision device, or the like. The second device 30 and the first device 20 can communicate with each other. In addition, the second device may be configured to have a plurality of units.

The terminal device 40 is a device for operating the information processing apparatus 10 or using a service provided by the information processing apparatus 10. The terminal device 40 is, for example, a personal computer, a smartphone, a tablet terminal, or the like.

Figure 2:
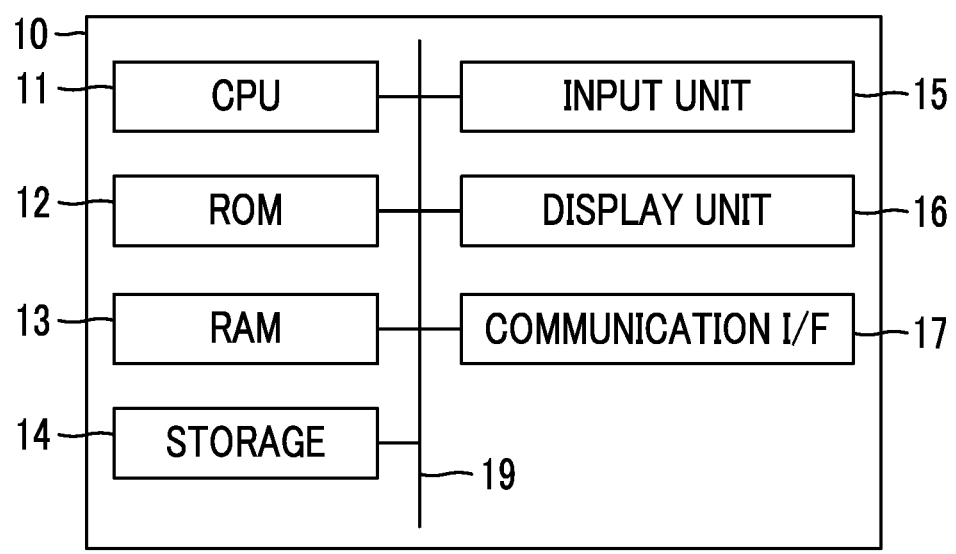
FIG. 2 is a block diagram showing a hardware configuration of an information processing apparatus according to the first exemplary embodiment.

FIG. 2 is a block diagram showing a hardware configuration of the information processing apparatus 10 according to the first exemplary embodiment. The information processing apparatus 10 includes each configuration of a central processing unit (CPU) 11, a read only memory (ROM) 12, a random access memory (RAM) 13, a storage 14, an input unit a display unit 16, and a communication interface (communication I/F) 17. Each configuration is communicatively connected to each other via a bus 19.

The CPU 11 is a central arithmetic processing unit that executes various programs and controls each unit. That is, the CPU 11 reads the program from the ROM 12 or the storage 14 to be described later, and executes the program using the RAM 13 as a work area. The CPU 11 controls each of the above configurations and performs various arithmetic processes according to the program stored in the ROM 12 or the storage 14. In the present exemplary embodiment, the ROM 12 or the storage 14 stores an information processing program for managing the second device 30. In the present disclosure, the ROM 12, the RAM 13, or the storage 14 may be referred to as memory.

The ROM 12 stores various programs and various types of data. The RAM 13 temporarily stores a program or data as a work area. The storage 14 is composed of a hard disk drive (HDD), a solid state drive (SSD), and stores various programs including an operating system and various types of data.

The input unit 15 includes, for example, a pointing device such as a mouse and a keyboard, and is used to perform various inputs.

The display unit 16 is, for example, a liquid crystal display, and displays various types of information. The display unit 16 may employ a touch panel method and function as the input unit 15.

The communication interface 17 is an interface for communicating with other device such as a database, and uses standards such as Ethernet (registered trademark), FDDI, and Wi-Fi (registered trademark), for example.

Next, a functional configuration of the information processing apparatus 10 will be described.

Figure 3:
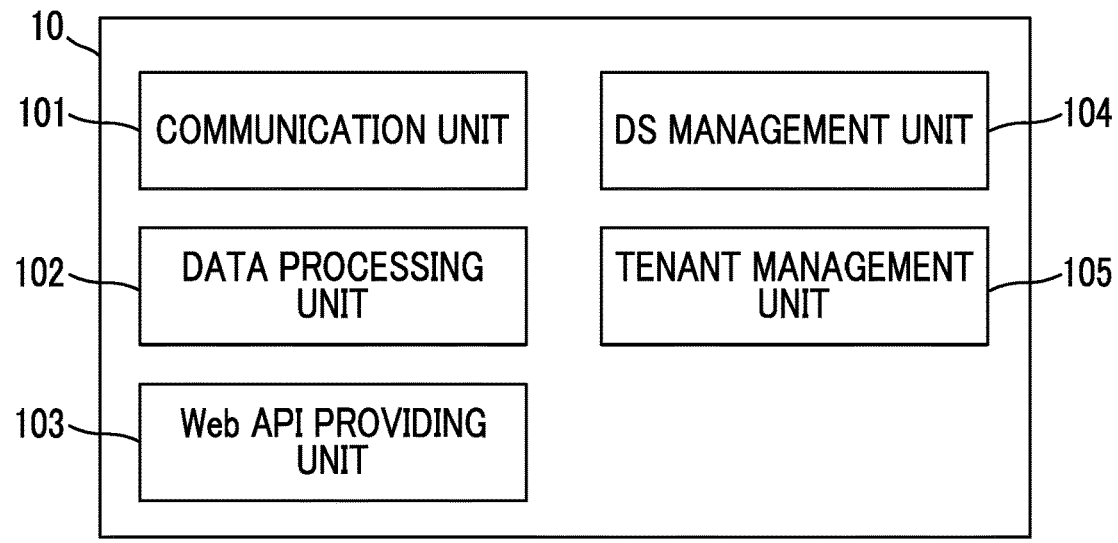
FIG. 3 is a block diagram showing a functional configuration of an information processing apparatus according to the first exemplary embodiment.

FIG. 3 is a block diagram showing a functional configuration of the information processing apparatus 10 according to the first exemplary embodiment. The information processing apparatus 10 includes a communication unit 101, a data processing unit 102, a web application programming interface (API) providing unit 103, a DS management unit 104, and a tenant management unit 105 as functional configurations. Each functional configuration is realized by the CPU 11 reading an information processing program stored in the ROM 12 or the storage 14, loading the information processing program in the RAM 13, and executing the information processing program.

The communication unit 101 communicates with the first device 20 and the terminal device 40 via the communication interface 17. The communication unit 101 acquires information about the first device 20 and information about the second device 30 from the first device 20. In addition, in the present disclosure, the information about the first device 20 may be referred to as installation data of the first device 20. Also, in the present disclosure, the information about the second device 30 may be referred to as a management information base (MIB) of the second device 30 or installation data of the second device 30.

The data processing unit 102 separates the information about the first device 20 and the information about the second device 30. That is, in a case where information in which the information about the first device 20 and the information about the second device 30 are integrated is received from the first device 20, the data processing unit 102 separates the information about the first device 20 and the information about the second device 30. The data processing unit 102 performs separation using identification information for identifying the device included in the information about the first device 20 or the information about the second device 30.

The Web API providing unit 103 provides Web API for managing virtual devices. The Web API providing unit 103 receives a request from the terminal device 40 or a managed print service (MPS) (not shown) and provides Web API.

The DS management unit 104 manages virtual devices in the form of data or program objects. The DS management unit 104 manages virtual devices using, for example, each device identification information table, a DS function correspondence list table, and each device synchronization data table. The table managed by the DS management unit 104 will be described later with reference to FIG. 7.

The tenant management unit 105 manages tenants. A tenant is, for example, a management unit for each customer or location. The tenant management unit 105 manages tenants using, for example, each customer identification information table and customer ID-DSID list table. The table managed by the tenant management unit 105 will be described later with reference to FIG. 8.

Figure 4:
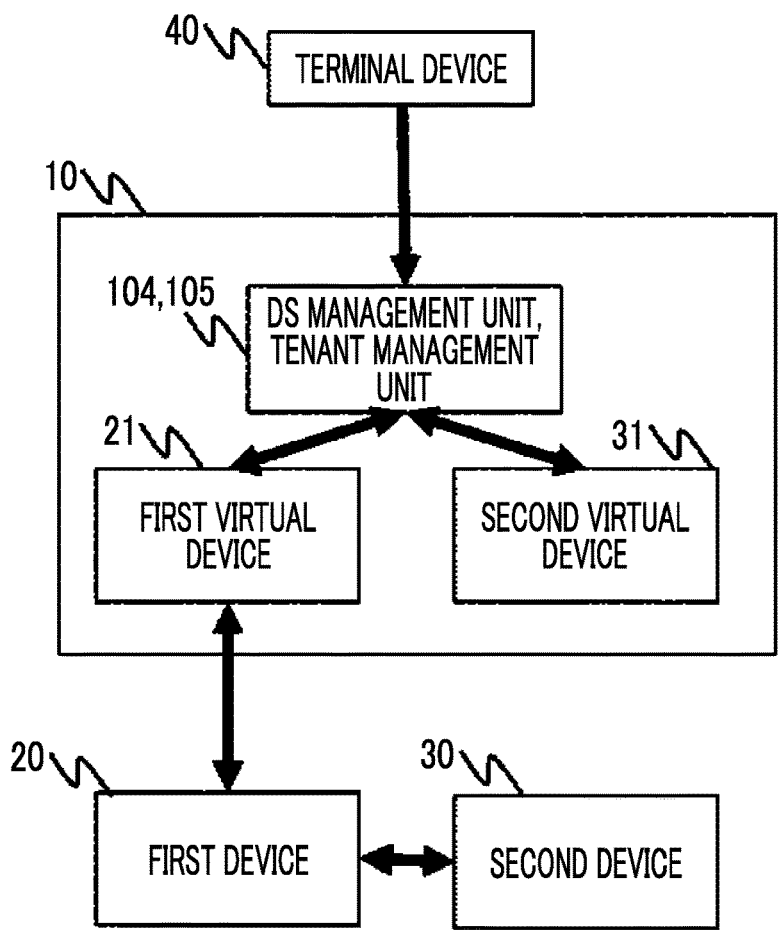
FIG. 4 is a diagram showing an example of a schematic configuration of the information processing system according to the first exemplary embodiment.

FIG. 4 is a diagram showing a schematic configuration of the information processing system 1 according to the first exemplary embodiment.

The terminal device 40 accesses the information processing apparatus 10 through Web communication including hypertext transfer protocol (HTTP) communication or the like using a browser or the like. Specifically, the terminal device accesses the DS management unit 104 and the tenant management unit 105 via the communication unit 101. The terminal device may access the information processing apparatus 10 via the MPS, for example. In this case, the MPS accesses the information processing apparatus 10 using Web API.

The DS management unit 104 or the tenant management unit 105 communicates with the first device 20 using hypertext transfer protocol secure (HTTPS) or the like. The DS management unit 104 or the tenant management unit 105 acquires the installation data of the first device 20 from the first device 20 in order to construct a first virtual device 21, which is a virtual device that is virtually realized using the information about the first device 20. The installation data includes information about a trusted platform module (TPM) chip, sysObjectID (sysOID, system OID), and identification information for identifying a device such as an ID obtained by concatenating a serial number to a product code. The DS management unit 104 or the tenant management unit 105 may check the authenticity of whether or not the item is to be managed based on the identification information. The DS management unit 104 or the tenant management unit 105 constructs the first virtual device 21 from the installation data of the first device 20. The DS management unit 104 or the tenant management unit 105 performs synchronization processing between the constructed first virtual device 21 and the first device 20.

Here, construction means creating an image of the virtual device and then reflecting information about the real device in the image. The DS management unit 104 or the tenant management unit 105 may create an image of the virtual device in advance, or may create the image after acquiring information about the real device. For example, the DS management unit 104 or the tenant management unit 105 creates an image of the virtual device before shipment of the real device or installation of the real device, and after installation of the real device, reflects the information about the real device in the image.

In addition, the DS management unit 104 or the tenant management unit 105 acquires the MIB of the second device 30 via the first device 20 in order to construct a second virtual device 31, which is a virtual device that is virtually realized using the information about the second device 30. In other words, the first device 20 acquires the MIB from the second device 30 and transmits the acquired MIB to the DS management unit 104 or tenant management unit 105. The DS management unit 104 or the tenant management unit 105 constructs the second virtual device 31 from the MIB of the second device 30. The MIB includes billing information, a toner remaining amount, a paper remaining amount, a parts replacement notification, a consumables replacement notification, a failure notification, or various types of device information. Also, in a case where there are a plurality of second devices 30, a second virtual device 31 is constructed for each device. The DS management unit 104 or the tenant management unit 105 performs synchronization processing between the constructed second virtual device 31 and the second device 30 via the first device 20.

Next, operation of the information processing system 1 will be described.

Figure 5:
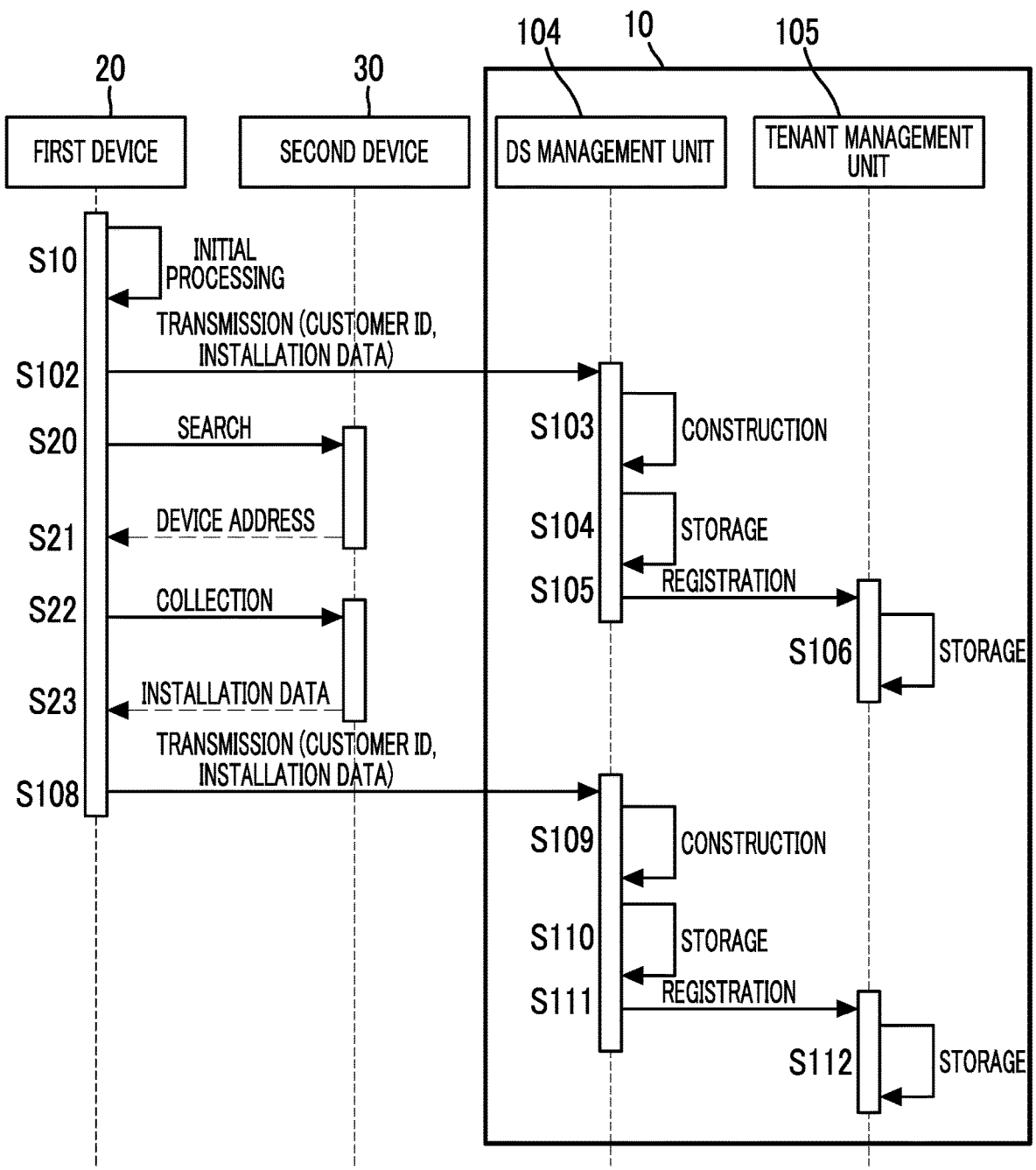
FIG. 5 is a sequence diagram showing a flow of management processing of the information processing system according to the first exemplary embodiment.

FIG. 5 is a sequence diagram showing a flow of management processing by the information processing system 1 according to the first exemplary embodiment. The step numbers shown in FIG. 5 are common to or correspond to the step numbers shown in FIG. 6, which will be described later.

In step S10, the first device 20 executes initial processing. The initial processing is, for example, processing performed in a case where the first device 20 is newly installed. The first device 20 receives the input of a customer ID by the user and generates installation data. The first device 20 may specify the customer ID from network information registered in advance in the DS management unit 104, for example, based on the connected network information. Here, the customer ID is a value for identifying a user or the like who uses the first device 20. The information processing system 1 proceeds to step S102.

In step S102, the customer ID and the installation data of the first device 20 are transmitted from the first device to the DS management unit 104. In other words, the DS management unit 104 acquires the customer ID and information about the first device 20 from the first device 20. The information processing system 1 proceeds to steps S103 and S20.

In step S103, the DS management unit 104 constructs the first virtual device 21. For example, the DS management unit 104 may reflect the installation data of the first device 20 in the image after creating the image, or reflect the installation data of the first device 20 in the image created in advance. The information processing system 1 proceeds to step S104.

In step S104, the DS management unit 104 stores the first device 20 and the first virtual device 21 in association with each other. The DS management unit 104, for example, assigns the identical identification value to the first device 20 and the first virtual device 21, and stores the first device 20 and the first virtual device 21 in association with each other. The DS management unit 104 employs DSID, which is identification information for identifying a virtual device, as the identification value. The information processing system 1 proceeds to step S105.

In step S105, the customer ID and the DSID of the first virtual device 21 are registered from the DS management unit 104 to the tenant management unit 105. The information processing system 1 proceeds to step S106.

In step S106, the tenant management unit 105 stores the first virtual device 21 and the customer ID in association with each other. As will be described later with reference to FIG. 8, the tenant management unit 105 registers the DSID and the customer ID of the first virtual device 21 in the customer ID-DSID list table.

In step S20, devices are searched from the first device to the second device 30. The first device 20 detects devices on the network by, for example, broadcast communication. The first device 20 may execute the search periodically, or may execute the search using, for example, communication from the second device 30 or the information processing apparatus 10 as a trigger. The information processing system 1 proceeds to step S21.

In step S21, a device address is transmitted from the second device 30 to the first device 20 corresponding to the process of step S20. A device address is, for example, an Internet protocol (IP) address, a media access control (MAC) address, or identification information for specifying a device. The information processing system 1 proceeds to step S22.

In step S22, installation data of the second device 30 is collected from the first device 20 to the second device 30. For example, the first device 20 may receive the installation data of the second device 30 from another already installed first device (not shown). The information processing system 1 proceeds to step S23.

In step S23, the installation data is transmitted from the second device 30 to the first device 20 corresponding to the process of step S22. The information processing system 1 proceeds to step S108.

In step S108, the customer ID and the installation data of the second device 30 are transmitted from the first device to the DS management unit 104. In other words, the DS management unit 104 acquires the installation data of the second device 30 via the first device 20. The first device may store a date and time the installation data has been collected, an interval at which the installation data has been collected, and a DSID of the device at which the installation data has been collected. The first device 20 may compare the installation data acquired last time with the installation data acquired this time, and transmit only the difference to the DS management unit 104. Further, the first device 20 may classify the installation data based on a type of installation data and update frequency information, and acquire and synchronize the data at intervals for each classification. The information processing system 1 proceeds to step S109.

In step S109, the DS management unit 104 constructs the second virtual device 31. The information processing system 1 proceeds to step S110.

In step S110, the DS management unit 104 stores the first virtual device 21 and the second virtual device 31 in association with each other. For example, as will be described later with reference to FIG. 7, the DS management unit 104 stores DSIDs in association with each other as a parent-child relationship in a DS function correspondence list table. The DS management unit 104 associates the DSID of the first virtual device 21 with the second virtual device 31, for example. The information processing system 1 proceeds to step S111.

In step S111, the customer ID and the DSID of the second virtual device 31 are registered from the DS management unit 104 to the tenant management unit 105. The information processing system 1 proceeds to step S112.

In step S112, the tenant management unit 105 stores the second virtual device 31 and the customer ID in association with each other. The information processing system 1 ends the management processing.

As described above, through the processes of steps S10 and S102, the DS management unit 104 receives the information about the first device 20 when the first device 20 is installed.

In addition, through the processes of steps S102, S20 to S23, and S108 described above, the DS management unit 104 acquires the information about the second device 30 using the reception of the information when the first device 20 is installed as a trigger.

Next, operation of the information processing apparatus will be described.

FIG. 6 is a flowchart showing a flow of management processing of the information processing apparatus 10 according to the first exemplary embodiment. Management processing is performed by the CPU 11 reading a management program from the ROM 12 or the storage 14, loading the management program into the RAM 13, and executing the management program.

In step S101, the CPU 11 determines whether or not the first device 20 has been installed. In a case where it is determined that the first device 20 has been installed (step S101: YES), the CPU 11 proceeds to step S102. In a case where it is determined that the first device 20 has not been installed (step S101: NO), the CPU 11 waits until the first device 20 is installed.

In step S102, the CPU 11 acquires information about the first device 20 from the first device 20. The CPU 11 proceeds to step S103.

In step S103, the CPU 11 constructs the first virtual device 21. That is, the CPU 11 constructs the first virtual device 21 from the information about the first device 20 and stores the first virtual device 21 in the memory. The CPU 11 proceeds to step S104.

In step S104, the CPU 11 stores the first device 20 and the first virtual device 21 in association with each other. The CPU 11 proceeds to step S105.

In step S105, the CPU 11 registers the customer ID and the DSID of the first virtual device 21. The CPU 11 proceeds to step S106.

In step S106, the CPU 11 stores the first virtual device 21 and the customer ID in association with each other. The CPU 11 proceeds to step S107.

In step S107, the CPU 11 reflects the information about the first device 20 in the first virtual device 21. The CPU 11 proceeds to step S108.

In step S108, the CPU 11 acquires information about the second device 30 via the first device 20. The CPU 11 proceeds to step S109.

In step S109, the CPU 11 constructs the second virtual device 31. That is, the CPU 11 stores the second virtual device 31 in the memory. The CPU 11 proceeds to step S110.

In step S110, the CPU 11 stores the first virtual device 21 and the second virtual device 31 in association with each other. The CPU 11 proceeds to step S111.

In step S111, the CPU 11 registers the customer ID and the DSID of the second virtual device 31. The CPU 11 proceeds to step S112.

In step S112, the CPU 11 stores the second virtual device 31 and the customer ID in association with each other. The CPU 11 proceeds to step S113.

In step S113, the CPU 11 reflects the information about the second device 30 in the second virtual device 31. The CPU 11 proceeds to step S114.

In step S114, the CPU 11 uses the information about the first device 20 reflected in the first virtual device 21. The CPU 11 proceeds to step S115.

In step S115, the CPU 11 uses the information about the second device 30 reflected in the second virtual device 31. The CPU 11 ends the management processing.

As described above, through the processes of steps S101 to S115, the CPU 11 uses the information about the first device 20 reflected in the first virtual device 21 and uses the information about the second device 30 reflected in the second virtual device 31.

FIG. 7 is an example of a table managed by the DS management unit 104 of the information processing apparatus 10 according to the first exemplary embodiment. The DS management unit 104 manages virtual devices using, for example, each device identification information table, a DS function correspondence list table, and each device synchronization data table.

Each device identification information table includes a DSID item, a DS name item, and a DS function presence/absence item. The DSID item is an item that stores the DSID. The DS name item is an item that stores the name of the virtual device. The DS function presence/absence item is an item that stores a value indicating whether or not the DS function is supported.

The DS function correspondence list table includes a parent DSID item and a child DSID item. The parent DSID item is an item that stores the DSID of a virtual device that manages another virtual device. The child DSID item is an item that stores the DSID of the virtual device managed by the virtual device identified by the parent DSID.

Each device synchronization data table includes a DSID item, a model code item, a serial number item, and a total number of output pages item. The model code item is an item that stores a value indicating the model of the real device corresponding to the virtual device. The serial number item is an item that stores the serial number such as the manufacturing number of the real device corresponding to the virtual device. The total number of output pages item is an item that stores a value indicating the scale or load of the virtual device such as the number of files.

FIG. 8 is an example of a table managed by the tenant management unit 105 of the information processing apparatus 10 according to the first exemplary embodiment. The tenant management unit 105 manages tenants using, for example, each customer identification information table and customer ID-DSID list table.

Each customer identification information table includes a customer ID item and a customer name item. The customer ID item is an item that stores identification information for identifying a customer. The customer name item is an item that stores the name of the customer.

The customer ID-DSID list table includes a customer ID item and a DSID item.

Second Exemplary Embodiment

Next, a second exemplary embodiment will be described. In addition to the method of the first exemplary embodiment, a method of the second exemplary embodiment performs switching processing to an alternative device in a case where synchronization processing between the second device 30 and the second virtual device 31 cannot be performed via the first device 20. A hardware configuration of the second exemplary embodiment is the same as the hardware configuration of the first exemplary embodiment. In addition, the identical reference numerals are given to portions having the same configuration and operation as in the first exemplary embodiment, and description thereof will be omitted.

Figure 9:
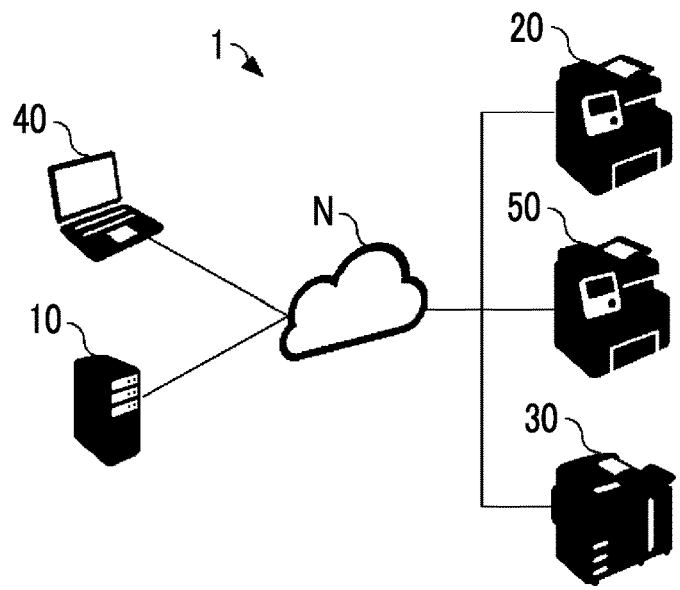
FIG. 9 is a system configuration diagram of an information processing system according to a second exemplary embodiment.

FIG. 9 is a system configuration diagram of an information processing system 1 according to the second exemplary embodiment. FIG. 9 shows a state in which synchronization processing between the second device 30 and the second virtual device 31 cannot be performed via the first device 20. The information processing system 1 includes the information processing apparatus 10, the first device 20, the second device 30, the terminal device 40, and an alternative device 50. Examples of a case where the synchronization processing between the second device 30 and the second virtual device 31 cannot be performed via the first device 20 include a failure of the first device 20, no response due to the power saving mode of the first device 20, or a failure of the network N to which the first device 20 is connected.

The alternative device 50 is a device that supports management via the network N. In other words, the alternative device 50 is a device that can communicate with a communication unit 101 of the information processing apparatus 10. That is, the alternative device 50 is another first device different from the first device 20. In the present disclosure, the alternative device 50 may be referred to as another device.

Figure 10:
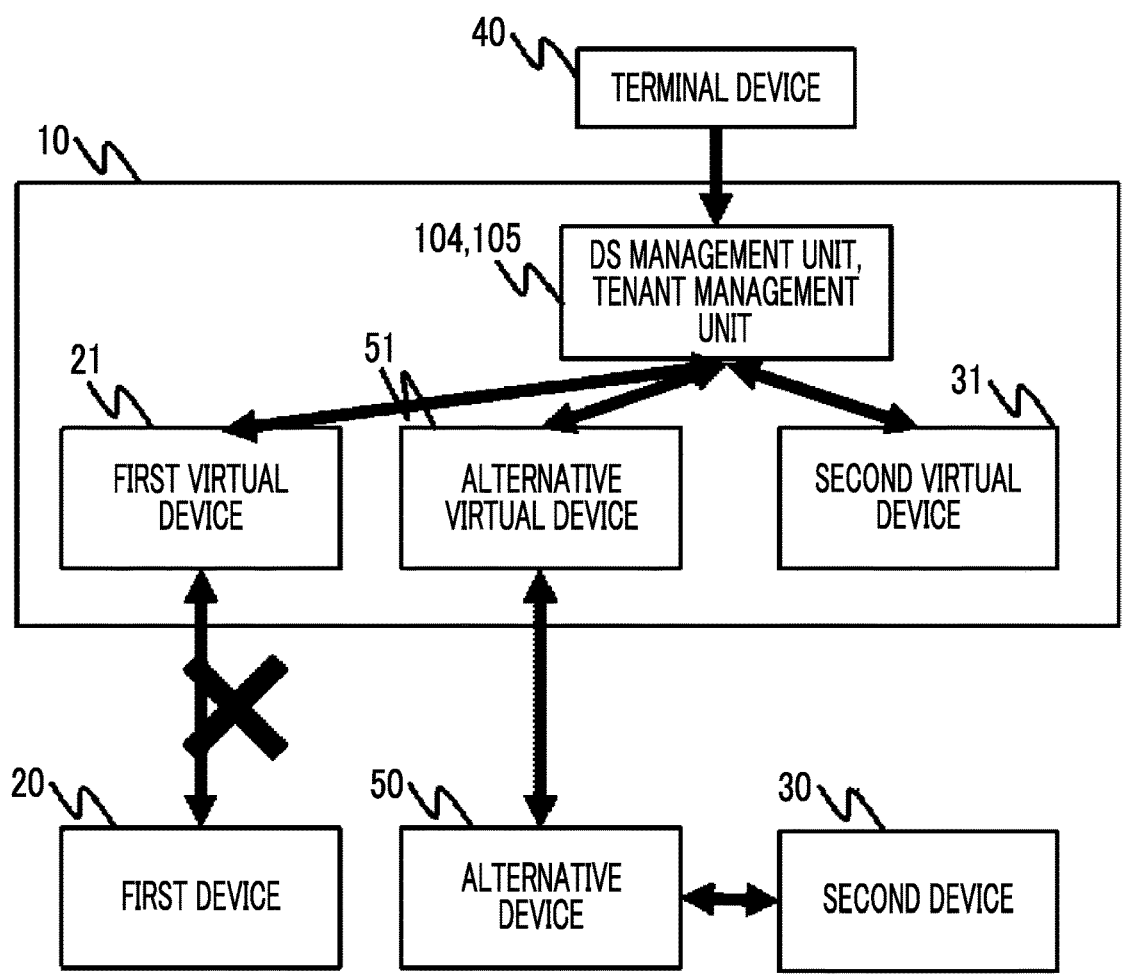
FIG. 10 is a diagram showing an example of a schematic configuration of the information processing system according to the second exemplary embodiment.

FIG. 10 is a diagram showing a schematic configuration of the information processing system 1 according to the second exemplary embodiment. FIG. 10 shows a state in which synchronization processing between the second device 30 and the second virtual device 31 cannot be performed via the first device 20 because the synchronization processing between the first device 20 and the first virtual device 21 cannot be performed.

The DS management unit 104 or the tenant management unit 105 constructs an alternative virtual device 51 that is a virtual device corresponding to the alternative device 50.

Also, the DS management unit 104 or the tenant management unit 105 uses the alternative virtual device 51 instead of the first virtual device 21. That is, in order to manage the second virtual device 31, the MIB of the second device 30 is acquired via the alternative device 50. In other words, the alternative device 50 acquires the MIB from the second device 30 and transmits the acquired MIB to the DS management unit 104 or tenant management unit 105. Then, the DS management unit 104 or the tenant management unit 105 performs synchronization processing between the second virtual device 31 and the second device 30 via the alternative device 50.

Next, operation of the information processing system 1 will be described.

Figure 11:
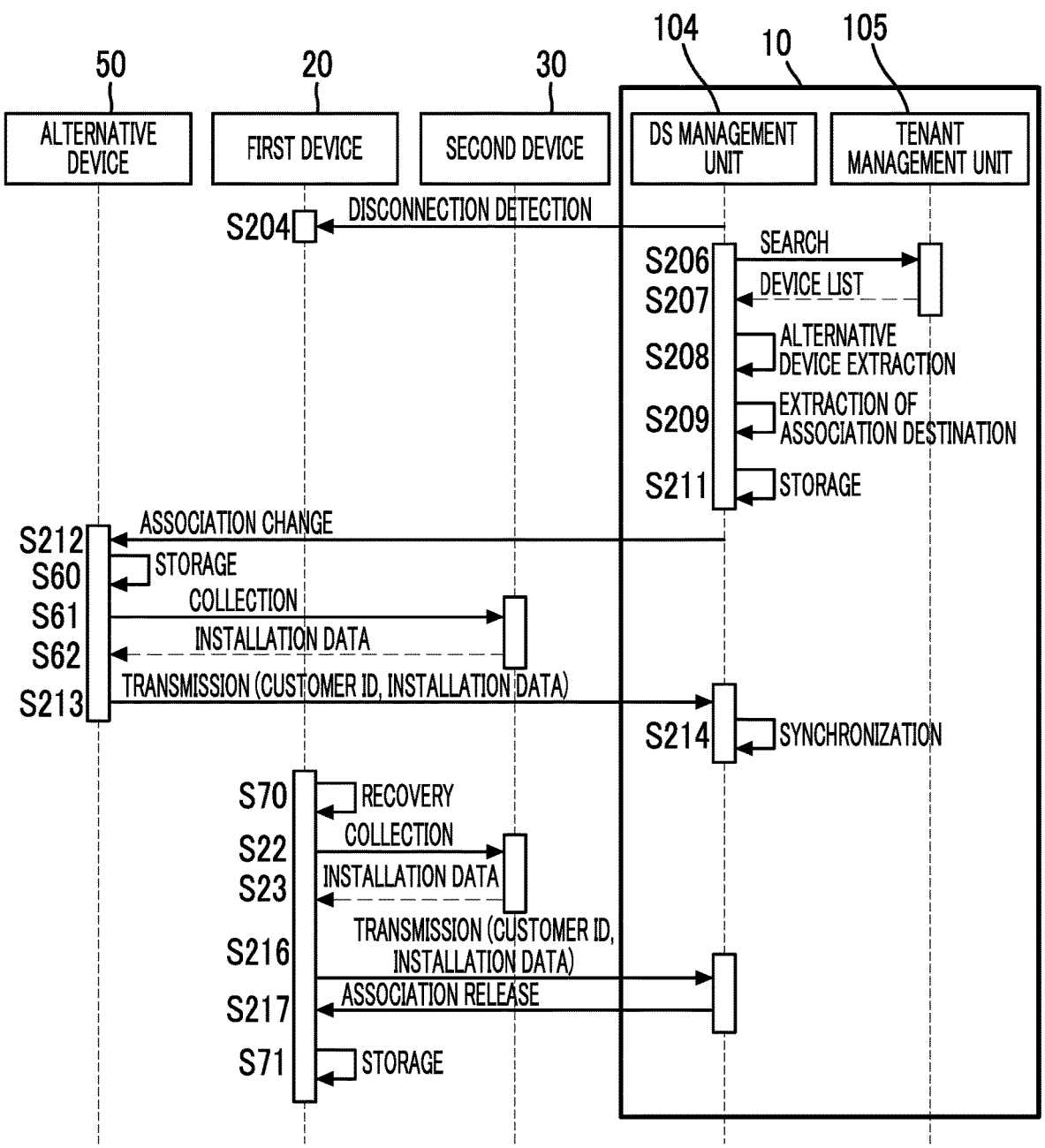
FIG. 11 is a sequence diagram showing a flow of switching processing of the information processing system according to the second exemplary embodiment.

FIG. 11 is a sequence diagram showing a flow of switching processing by the information processing system 1 according to the second exemplary embodiment. Note that the step numbers shown in FIG. 11 are common to or correspond to the step numbers shown in FIG. 12.

In step S204, the DS management unit 104 detects a disconnection from the first device 20. The DS management unit 104 determines that the disconnection has been detected, for example, in a case where there is no response from the first device 20 or in a case where the first device 20 is in a predetermined state. Predetermined states are, for example, no response, restarting, alert generation state, and the like. The DS management unit 104, for example, detects a disconnection through periodic polling or simple network management protocol (SNMP) trap notification. The information processing system 1 proceeds to step S206.

In step S206, the DS management unit 104 searches the tenant management unit 105 for a device list from the customer ID. That is, the DS management unit 104 acquires the DSID associated with the customer ID from the customer ID-DSID list table of FIG. 8 described above. The information processing system 1 proceeds to step S207.

In step S207, the device list is transmitted from the tenant management unit 105 to the DS management unit 104 corresponding to the process of step S206. The information processing system 1 proceeds to step S208.

In step S208, the DS management unit 104 extracts the alternative device 50 from the device list. The information processing system 1 proceeds to step S209.

In step S209, the DS management unit 104 extracts an association destination of the first device 20. That is, the DS management unit 104 acquires a child DSID associated with the parent DSID, which is the DSID of the first virtual device 21 corresponding to the first device 20, from the DS function correspondence list table of FIG. 7 described above. The information processing system 1 proceeds to step S211.

In step S211, the DS management unit 104 stores the second device 30 and the alternative device 50 in association with each other. The information processing system 1 proceeds to step S212.

In step S212, the DS management unit 104 causes the alternative device 50 to change the association. The information processing system 1 proceeds to step S60.

In step S60, the alternative device 50 stores the alternative device 50 and the second device 30 in association with each other. The information processing system 1 proceeds to step S61.

In step S61, installation data of the second device 30 is collected from the alternative device 50 to the second device 30. The information processing system. 1 proceeds to step S62.

In step S62, the installation data of the second device is transmitted from the second device 30 to the alternative device 50 corresponding to the process of step S22. The information processing system 1 proceeds to step S213.

In step S213, the customer ID and the installation data are transmitted from the alternative device 50 to the DS management unit 104. In other words, the DS management unit 104 acquires information about the second device 30 from the alternative device 50. The information processing system 1 proceeds to step S214.

In step S214, the DS management unit 104 synchronizes the information about the second device 30 between the second virtual device 31 and the second device 30.

In step S70, the first device 20 is recovered. For example, the first device 20 is recovered by repair or restart processing by the user. The information processing system 1 proceeds to step S22.

In step S22, installation data of the second device 30 is collected from the first device 20 to the second device 30. The information processing system 1 proceeds to step S23.

In step S23, the installation data of the second device 30 is transmitted from the second device 30 to the first device 20 corresponding to the process of step S22. The information processing system 1 proceeds to step S216.

In step S216, the customer ID and the installation data are transmitted from the first device 20 to the DS management unit 104. In other words, the DS management unit 104 acquires information about the second device 30 from the first device 20. The information processing system 1 proceeds to step S217.

In step S217, the DS management unit 104 causes the first device 20 to release the association. That is, the DS management unit 104 instructs the first device 20 to release the association between the first device 20 and the second device 30. The information processing system 1 proceeds to step S71.

In step S71, the first device 20 stores that the first device 20 and the second device 30 are not associated with each other. That is, the first device 20 releases the association between the first device 20 and the second device 30. The information processing system 1 ends the switching processing.

Next, operation of the information processing apparatus 10 will be described.

Figure 12:
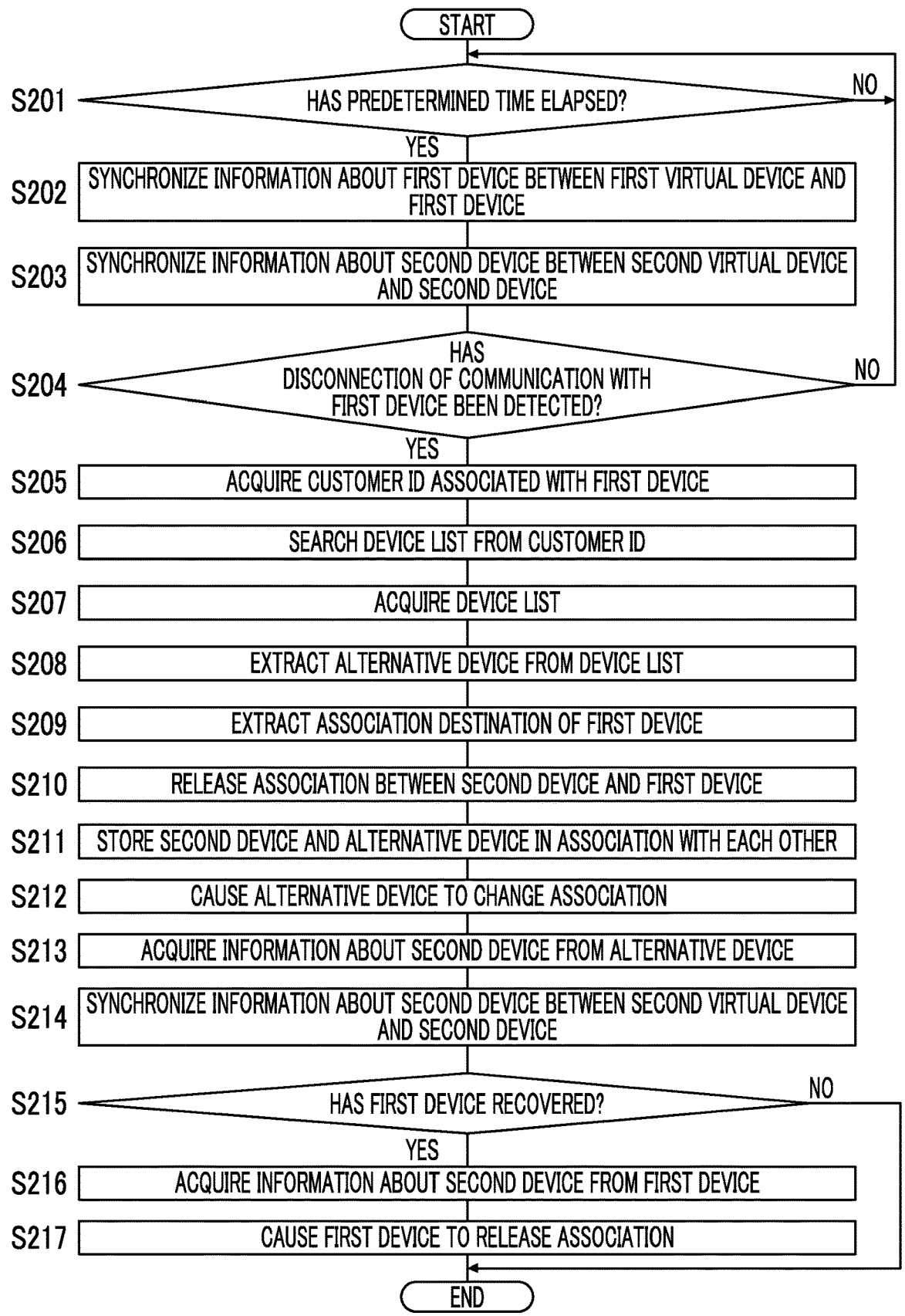
FIG. 12 is a flowchart showing a flow of switching processing of an information processing apparatus according to the second exemplary embodiment.

FIG. 12 is a flowchart showing a flow of switching processing of the information processing apparatus 10 according to the first exemplary embodiment. Switching processing is performed by the CPU 11 reading a switching program from the ROM 12 or the storage 14, loading the switching program into the RAM 13, and executing the switching program.

In step S201, the CPU 11 determines whether or not a predetermined time has elapsed. The CPU 11 may execute the update at predetermined timings including the execution of updating the software of the first device 20. In a case where it is determined that the predetermined time has elapsed (step S201: YES), the CPU 11 proceeds to step S202. In a case where it is determined that the predetermined time has not elapsed (step S201: NO), the CPU 11 waits until the predetermined time elapses.

In step S202, the CPU 11 synchronizes the information about the first device 20 between the first virtual device 21 and the first device 20. The CPU 11 proceeds to step S203.

In step S203, the CPU 11 synchronizes the information about the second device 30 between the second virtual device 31 and the second device 30. The CPU 11 proceeds to step S204.

In step S204, the CPU 11 determines whether or not a disconnection of communication with the first device 20 has been detected. The CPU 11 determines that the disconnection has been detected, for example, in a case where there is no response from the first device 20 or in a case where the first device 20 is in a predetermined state. In a case where it is determined that the disconnection of communication with the first device 20 has been detected (step S204: YES), the CPU 11 proceeds to step S205. In a case where it is determined that the disconnection of communication with the first device 20 has not been detected (step S204: NO), the CPU 11 proceeds to step S201.

In step S205, the CPU 11 acquires the customer ID associated with the first device 20. The CPU 11 proceeds to step S206.

In step S206, the CPU 11 searches the device list from the customer ID. The device list is, for example, a list of devices with which the first device 20 can communicate by broadcast communication. For example, the CPU 11 acquires from the first device 20 and registers a list of devices with which the first device 20 has communicated in step S20 of FIG. 5. The CPU 11 proceeds to step S207.

In step S207, the CPU 11 acquires a device list. The CPU 11 proceeds to step S208.

In step S208, the CPU 11 extracts the alternative device 50 from the device list. For example, the CPU 11 sets, among the devices listed in the device list, a device that responds to communication as the alternative device 50. The CPU 11 extracts an alternative device based on information including information representing a reachable unit for communication, such as a subnet, base, floor, or the like. The CPU 11 proceeds to step S209.

In step S209, the CPU 11 extracts the association destination of the first device 20. The CPU 11 proceeds to step S210.

In step S210, the CPU 11 releases the association between the second device 30 and the first device 20. The CPU 11 deletes the rows of the parent DSID which is the DSID of the first virtual device 21 corresponding to the first device 20, and the child DSID, which is the DSID of the second virtual device 31 corresponding to the second device 30, from the DS function correspondence list table of FIG. 7 described above. The CPU 11 proceeds to step S211.

In step S211, the CPU 11 stores the second device 30 and the alternative device 50 in association with each other. The CPU 11 proceeds to step S212.

In step S212, the CPU 11 causes the alternative device 50 to change the association. The CPU 11 proceeds to step S213.

In step S213, the CPU 11 acquires information about the second device 30 from the alternative device 50. The CPU 11 proceeds to step S214.

In step S214, the CPU 11 synchronizes the information about the second device 30 between the second virtual device 31 and the second device 30. The CPU 11 proceeds to step S215.

In step S215, the CPU 11 determines whether or not the first device 20 has recovered. In a case where it is determined that the first device 20 has recovered (step S215: YES), the CPU 11 proceeds to step S216. In a case where it is determined that the first device 20 has not recovered (step S215: NO), the CPU 11 ends the switching processing.

In step S216, the CPU 11 acquires information about the second device 30 from the first device 20. That is, the CPU 11 determines that the first device 20 has been recovered by transmitting the information about the second device 30 from the first device 20. The CPU 11 proceeds to step S217.

In step S217, the CPU 11 causes the first device 20 to release the association. That is, the CPU 11 instructs the first device 20 to release the association between the first device 20 and the second device 30. The CPU 11 ends the switching processing.

As described above, through the processes from steps S204 to S213, in a case where the first device 20 is in a predetermined state, the association between the first device 20 and the second device 30 is released, the alternative device 50 and the second device 30 are associated with each other, and acquisition of the information about the second device 30 from the alternative device 50 is enabled.

Further, through the processes from steps S201 to S203, at a predetermined timing, the information about the first device 20 is synchronized between the first virtual device 21 and the first device 20, and the information about the second device 30 is synchronized between the second virtual device 31 and the second device 30.

Modification Example

The information processing apparatuses 10 of the first exemplary embodiment and the second exemplary embodiment have been described above. However, the present disclosure is not limited to the above exemplary embodiments. Various improvements or modifications are possible.

Figure 13:
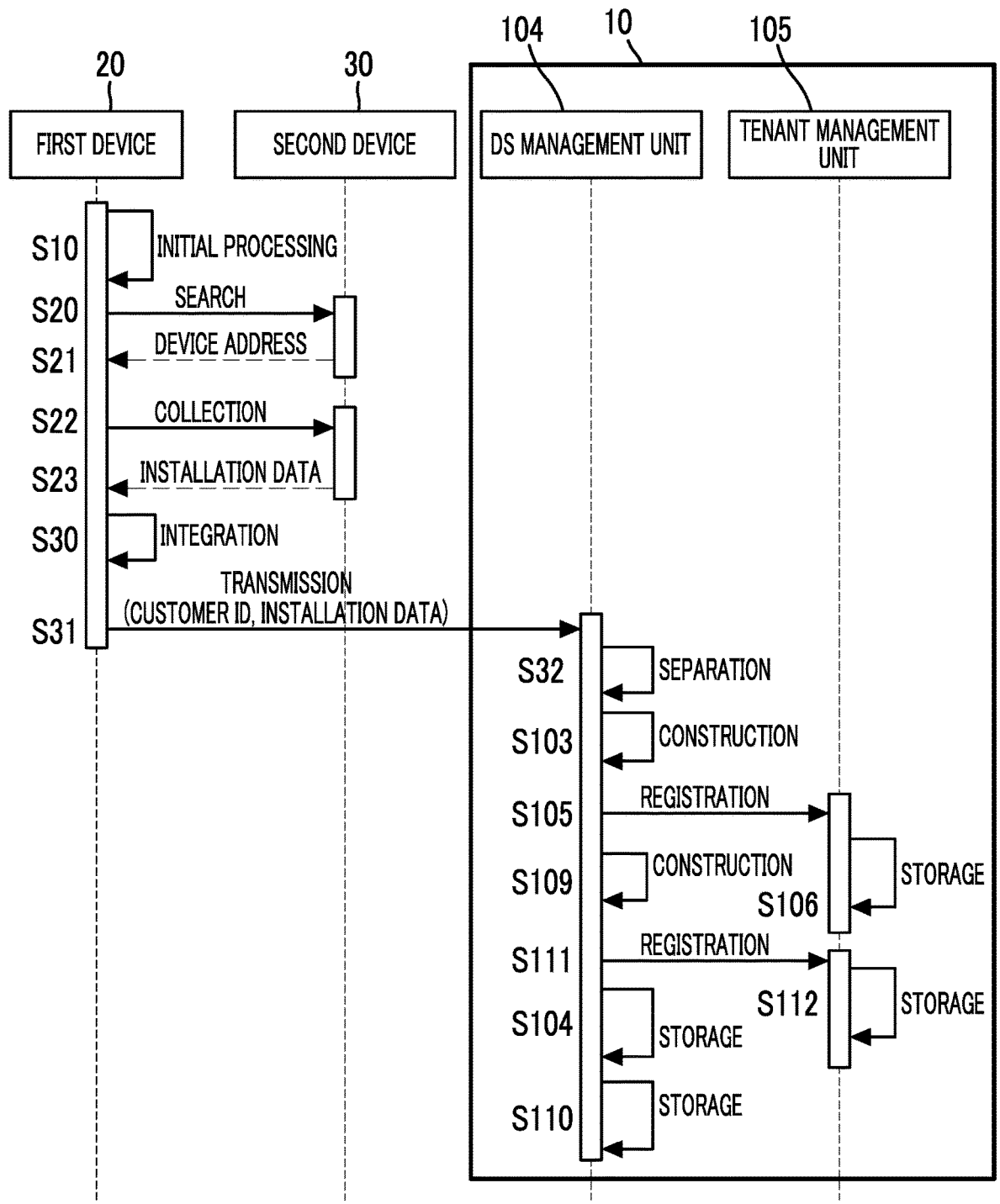
FIG. 13 is a sequence diagram showing a flow of management processing of an information processing system according to a modification example.

FIG. 13 is a sequence diagram showing a flow of management processing by the information processing system 1. Specifically, FIG. 13 shows a flow of management processing in a case where the installation data of the first device 20 and the installation data of the second device 30 are integrated and transmitted to the information processing apparatus 10. Note that the description of the identical processing as in the flowchart of FIG. 5 will be omitted.

The information processing system 1 executes steps S10 and S20 to S23. The information processing system 1 proceeds to step S30.

In step S30, the first device 20 integrates the installation data of the first device 20 and the installation data of the second device 30. The first device 20 may convert the data format. The information processing system 1 proceeds to step S31.

In step S31, the customer ID and the integrated installation data are transmitted from the first device 20 to the DS management unit 104. In other words, the DS management unit 104 acquires information that integrates the installation data of the first device 20 and the installation data of the second device 30. The information processing system 1 proceeds to step S32.

In step S32, the DS management unit 104 separates the integrated installation data into the installation data of the first device 20 and the installation data of the second device 30. The DS management unit 104 performs separation based on the identification information included in the installation data. The DS management unit 104 may convert the data format. The information processing system 1 proceeds to step S103.

The information processing system 1 executes steps S103, S105, S106, S109, S111, S104, S110 and S112. The information processing system 1 ends the management processing.

As described above, through the processes of steps S10, S20 to S23, S30, and S31 described above, the DS management unit 104 receives, when the first device 20 is installed, the information about the first device 20 and the information about the second device 30 acquired from the second device 30 by the first device 20 when the first device 20 is installed.

Figure 14:
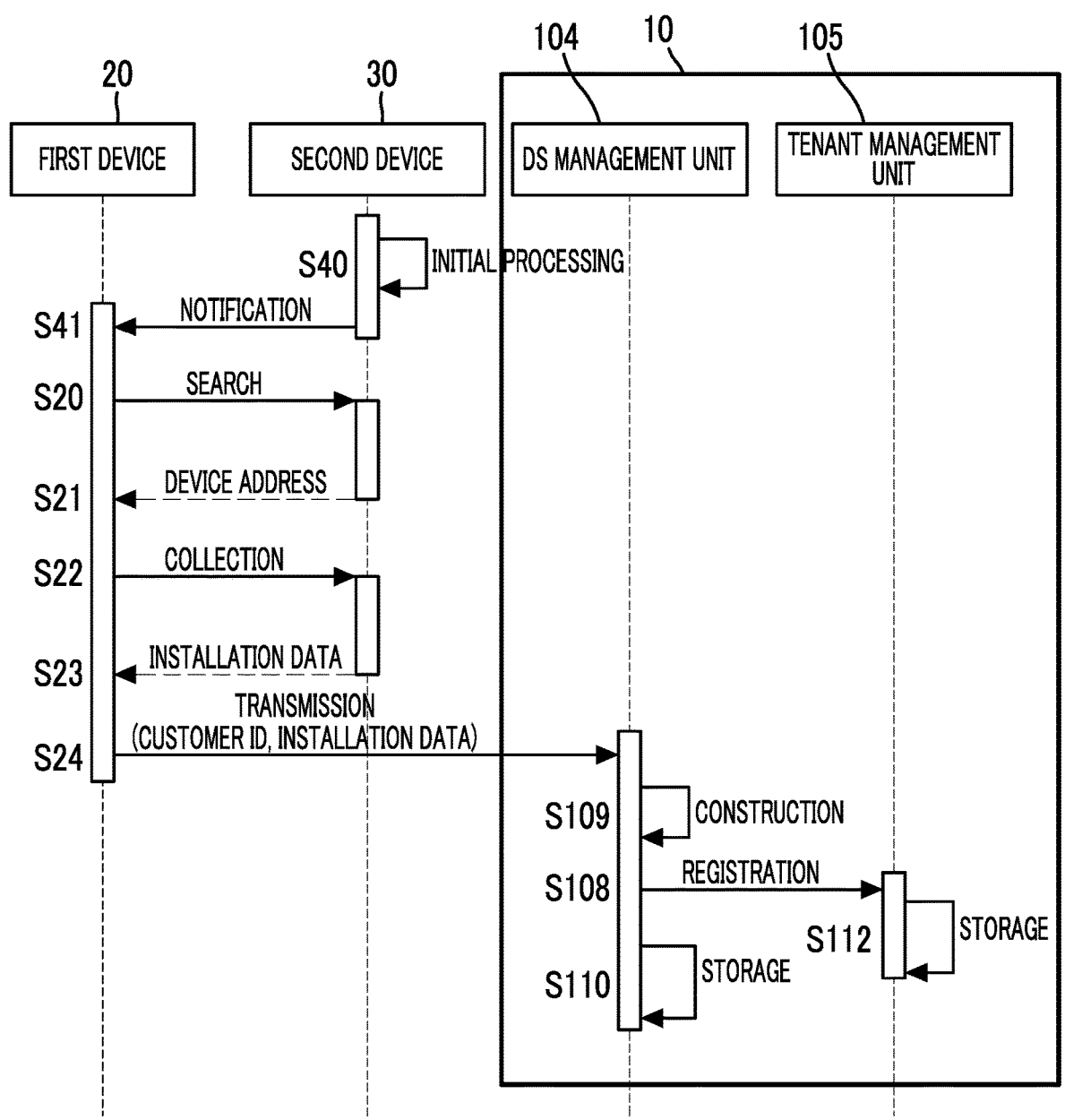
FIG. 14 is a sequence diagram showing a flow of management processing of an information processing system according to a modification example.

FIG. 14 is a sequence diagram showing a flow of management processing by the information processing system 1. Specifically, FIG. 14 shows a flow of management processing in a case where the second device 30 is installed after the first device 20 is installed. Note that the description of the identical processing as in the flowchart of FIG. 5 will be omitted.

In step S40, the second device 30 executes initial processing. The initial processing is, for example, processing performed in a case where the second device 30 is newly installed. The information processing system 1 proceeds to step S41.

In step S41, the second device 30 notifies the first device 20. The second device 30 performs, for example, an SNMP trap notification, a notification that the device has been added to the network, or a request to construct a virtual device. The information processing system 1 proceeds to step S20.

The information processing system 1 executes steps S20 to S24, S109, S108, S110, and S112. The information processing system 1 ends the management processing.

Regarding the process of step S108 in FIG. 5, the first device 20 may execute step S108 in a case where the process of step S105 is completed. That is, the DS management unit 104 or the tenant management unit 105 transmits a registration completion response to the first device 20 after executing the process of step S105 or step S106. After receiving the registration completion response, the first device 20 transmits the customer ID and the installation data.

The information processing apparatus 10 according to the first exemplary embodiment may reflect the information about the second device 30 in the second virtual device 31 in a case where the information about the second device 30 satisfies a predetermined requirement. Here, the predetermined requirement is, for example, that the device is registered in advance as a device to be contractually managed. The information processing apparatus 10 determines whether or not a predetermined requirement is satisfied, for example, based on an encryption key or a preset password included in the TPM, which is installation data.

The above processing can also be realized by a dedicated hardware circuit. In this case, the processing may be executed by a single piece of hardware, or may be executed by a plurality of pieces of hardware.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, the program for operating the information processing apparatus 10 may be provided by a computer-readable recording medium such as a Universal Serial Bus (USB) memory, a flexible disk, a Compact Disc Read Only Memory (CD-ROM), and the like or may be provided online via a network such as the Internet. In this case, the program recorded on the computer-readable recording medium is usually transferred to and stored in a memory, a storage, or the like. Further, this program may be provided, for example, as independent application software, or may be incorporated into the software of each apparatus as one function of the information processing apparatus 10.

Supplementary Note

Exemplary embodiments of the present disclosure are additionally described below.

(1) An information processing apparatus including:
a memory; and
a processor configured to:
  store, in the memory, a first virtual device that is virtually realized using information about a first device and a second virtual device that is virtually realized using information about a second device;
  acquire the information about the first device from the first device capable of communicating with a communication unit of the information processing apparatus, and reflect the acquired information about the first device in the first virtual device;
  acquire, via the first device, the information about the second device from the second device incapable of communicating with the communication unit, and reflect the acquired information about the second device in the second virtual device; and
  use the information about the first device reflected in the first virtual device, and use the information about the second device reflected in the second virtual device.

(2) The information processing apparatus according to (1), in which the processor is configured to:
receive the information about the first device when the first device is installed.

(3) The information processing apparatus according to (1) or (2), in which the processor is configured to:
acquire the information about the second device using a reception of information when the first device is installed as a trigger.

(4) The information processing apparatus according to any one of (1) to (3), in which the processor is configured to:
receive, when the first device is installed, the information about the first device and the information about the second device acquired from the second device by the first device when the first device is installed.

(5) The information processing apparatus according to any one of (1) to (4), in which the processor is configured to:
store the second device in association with the first device that acquires the information about the second device.

(6) The information processing apparatus according to (5), in which the processor is configured to:
in a case where the first device is in a predetermined state, release the association between the first device and the second device, associate another device with the second device, and enable acquisition of the information about the second device from the other device.

(7) The information processing apparatus according to any one of (1) to (6), in which the information about the first device and the information about the second device are information about a management information base including billing information, a toner remaining amount, a paper remaining amount, a parts replacement notification, a consumables replacement notification, a failure notification, or various types of device information.

(8) The information processing apparatus according to any one of (1) to (7), in which the processor is configured to:
at a predetermined timing, synchronize the information about the first device between the first virtual device and the first device, and synchronize the information about the second device between the second virtual device and the second device.

(9) The information processing apparatus according to any one of (1) to (8), in which the processor is configured to:
in a case where the acquired information about the second device satisfies a predetermined requirement, reflect the information about the second device in the second virtual device.

(10) The information processing apparatus according to any one of (1) to (9), in which the information about the first device includes identification information for identifying the first device, and the information about the second device includes identification information for identifying the second device.

(11) A non-transitory computer readable medium storing an information processing program causing a processor to execute a process including:
  storing, in a memory, a first virtual device that is virtually realized using information about a first device and a second virtual device that is virtually realized using information about a second device;
  acquiring the information about the first device from the first device capable of communicating with a communication unit of the information processing apparatus, and reflecting the acquired information about the first device in the first virtual device;
  acquiring, via the first device, the information about the second device from the second device incapable of communicating with the communication unit, and reflecting the acquired information about the second device in the second virtual device; and using the information about the first device reflected in the first virtual device, and using the information about the second device reflected in the second virtual device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a memory; and
   a processor configured to:
     store, in the memory, a first virtual device that is virtually realized using information about a first device and a second virtual device that is virtually realized using information about a second device;
     acquire the information about the first device from the first device capable of communicating with a communication unit of the information processing apparatus, and reflect the acquired information about the first device in the first virtual device;
     acquire, via the first device, the information about the second device from the second device incapable of communicating with the communication unit, and reflect the acquired information about the second device in the second virtual device; and
     use the information about the first device reflected in the first virtual device, and use the information about the second device reflected in the second virtual device.

2. The information processing apparatus according to claim 1, wherein the processor is configured to:
   receive the information about the first device when the first device is installed.

3. The information processing apparatus according to claim 2, wherein the processor is configured to:
   acquire the information about the second device using a reception of information when the first device is installed as a trigger.

4. The information processing apparatus according to claim 1, wherein the processor is configured to:
   receive, when the first device is installed, the information about the first device and the information about the second device acquired from the second device by the first device when the first device is installed.

5. The information processing apparatus according to claim 1, wherein the processor is configured to:
   store the second device in association with the first device that acquires the information about the second device.

6. The information processing apparatus according to claim 5, wherein the processor is configured to:
   in a case where the first device is in a predetermined state, release the association between the first device and the second device, associate another device with the second device, and enable acquisition of the information about the second device from the other device.

7. The information processing apparatus according to claim 1,
   wherein the information about the first device and the information about the second device are information about a management information base including billing information, a toner remaining amount, a paper remaining amount, a parts replacement notification, a consumables replacement notification, a failure notification, or various types of device information.

8. The information processing apparatus according to claim 1, wherein the processor is configured to:
   at a predetermined timing, synchronize the information about the first device between the first virtual device and the first device, and synchronize the information about the second device between the second virtual device and the second device.

9. The information processing apparatus according to claim 1, wherein the processor is configured to:
   in a case where the acquired information about the second device satisfies a predetermined requirement, reflect the information about the second device in the second virtual device.

10. The information processing apparatus according to claim 1,
    wherein the information about the first device includes identification information for identifying the first device, and the information about the second device includes identification information for identifying the second device.

11. A non-transitory computer readable medium storing an information processing program causing a processor to execute a process comprising:
    storing, in a memory, a first virtual device that is virtually realized using information about a first device and a second virtual device that is virtually realized using information about a second device;
    acquiring the information about the first device from the first device capable of communicating with a communication unit of the information processing apparatus, and reflecting the acquired information about the first device in the first virtual device;
    acquiring, via the first device, the information about the second device from the second device incapable of communicating with the communication unit, and reflecting the acquired information about the second device in the second virtual device; and
    using the information about the first device reflected in the first virtual device, and using the information about the second device reflected in the second virtual device.

12. An information processing method comprising:
    storing, in a memory, a first virtual device that is virtually realized using information about a first device and a second virtual device that is virtually realized using information about a second device;
    acquiring the information about the first device from the first device capable of communicating with a communication unit of the information processing apparatus, and reflecting the acquired information about the first device in the first virtual device;
    acquiring, via the first device, the information about the second device from the second device incapable of communicating with the communication unit, and reflecting the acquired information about the second device in the second virtual device; and using the information about the first device reflected in the first virtual device, and using the information about the second device reflected in the second virtual device.

\* \* \* \* \*